United States Patent [19]

Chen et al.

[11] Patent Number: 4,590,056
[45] Date of Patent: May 20, 1986

[54] METHOD OF MAKING CARBON BLACK HAVING LOW ASH CONTENT FROM CARBONACEOUS MATERIALS

[75] Inventors: Wenjai R. Chen; Robert L. Savage, both of Athens, Ohio

[73] Assignee: Ohio University, Athens, Ohio

[21] Appl. No.: 707,258

[22] Filed: Mar. 1, 1985

[51] Int. Cl.$^4$ .................. C01B 31/02; C09C 1/48; C07C 1/02
[52] U.S. Cl. .................................... 423/449; 423/450; 252/373
[58] Field of Search .............. 423/449, 450, 458, 460; 252/373

[56] References Cited

FOREIGN PATENT DOCUMENTS 38-16107  8/1963  Japan .................................. 423/449
1024474  3/1966  United Kingdom ................ 423/449

Primary Examiner—Gregory A. Heller
Attorney, Agent, or Firm—John L. Gray

[57] ABSTRACT

Commercially acceptable carbon black may be produced from coal or other carbonaceous material with the ash content in the resultant product kept below approximately one percent (1%) by controlling the oxygen to coal weight ratio so that it is less than 0.4 and by starting the process with coal or other carbonaceous material in a size range of from 75 to 1700 microns.

10 Claims, No Drawings

METHOD OF MAKING CARBON BLACK HAVING LOW ASH CONTENT FROM CARBONACEOUS MATERIALS

BACKGROUND OF THE INVENTION

At the present time, petroleum or natural gas is used as the starting material in the commercial production of carbon black. It is well known that carbon black can be produced from carbonaceous material, such as coal. Such patents as U.S. Pat. Nos. 3,424,556, Johnson, and 3,975,504, Cheng, disclose processes for producing carbon black from coal.

Commercially acceptable carbon black, however, has not been produced from coal or other carbonaceous material because of the high ash content of the resultant product, and the extreme difficulty and expense in attempting to separate the ash from the carbon black, although otherwise the economics would be favorable to such a process if the ash content could be reduced.

In producing carbon black from coal in accordance with the processes of the prior art, ash is also produced and the separation process is extremely difficult so that it is not feasible to make carbon black with an ash content of less than one percent, which constitutes the commercially acceptable standard.

SUMMARY OF THE INVENTION

By controlling the operating conditions in the production of carbon black from coal or other carbonaceous material according to this invention, the ash is not actually released from the coal but instead is trapped in the char, thus making feasible the production of carbon black satisfactory for commercial use with an ash content of less than one percent. In addition to the normal conditions of temperature, pressure, and residence time that are well known, the oxygen to coal weight ratio and the particle size of the coal must be controlled. In controlling the last two mentioned variables, only the volatile portion of the coal is converted to carbon black so that all of the ash and some of the carbon are retained in the original coal matrix, referred to as char. The char is a size which is at least an order of magnitude greater than the size of the carbon black and thus can readily be separated from the carbon black by gravity or cyclone separator.

It is therefore an object of this invention to provide a method of producing carbon black having an ash content of less than one percent from carbonaceous materials such as coal, lignites, tar sand, pitch, oil shale, and asphaltic substances.

It is also an object of this invention to provide a method of producing carbon black from a carbonaceous material where only the volatile portion thereof is converted to carbon black so that all of the ash and some of the carbon are retained in the original carbonaceous matrix.

It is a still further object of this invention to provide such a product at a competitive cost.

These together with other objects and advantages of the invention will become apparent from the following detailed description of the invention.

DETAILED DESCRIPTION OF THE INVENTION

While this invention is applicable to other carbonaceous materials than coal, such as lignites, tar sand, pitch, oil shale, and asphaltic substances, it will be described in detail in its application to coal.

In practicing the method of this invention, it is important to control the oxygen/coal ratio and the particle size of the coal. This enables only the volatile portion of the coal to be converted to carbon black so that all of the ash and some of the carbon are retained in the original coal matrix. A synthesis gas is also produced. The char is combustible, as is the synthesis gas, and both of these products can be used to provide the energy for the process; the rest can be sold as fuel.

In practicing this invention, the coal and the oxygen are reacted at temperatures of from 2200° F. to 3000° F. and the residence time is very short, usually less than a second.

In the case of coal, the average particle size of the starting material is from 75 microns to 1700 microns and the oxygen to coal weight ratio is 0.4 or less. The preferred oxygen to coal weight ratio is from 0.1 to 0.3 and the preferred particle size of the starting material is from 150 microns to 850 microns. If the oxygen to coal weight ratio is too high, the yield of carbon black is sharply reduced and as a consequence the ash content is above an acceptable limit. If the oxygen to coal ratio is too low, the yield of carbon black is lowered, even though the ash content is less than one percent.

If the particle size of the carbonaceous material is too small, though the yield of carbon black will be satisfactory, the ash content will be too high.

If the particle size of the carbonaceous material is too high, the yield will be reduced, even though the ash content is within commercially acceptable limits.

This will be seen from the following examples. In all cases, a typical bituminous coal with an ash content of 12 percent was used. A vertically entrained flow reactor can be employed in the process, which may be heated indirectly from a hot reactor wall or directly by mixing the coal with a hot combustion gas. The hot combustion gas may be introduced concurrently or tangentially into the reactor. Carbon black, synthesis gas and char are generated in the reaction zone in less than one second. The char is then separated from the carbon black and synthesis gas by means of a gravity separator, and the synthesis gas and the entrained carbon black are then separated using any conventional device such as a bag filter, impingement separator, or an electrostatic precipitator.

EXAMPLE 1

In this case, coal size was from 150 to 425 microns and for every one pound per minute of coal that was passed through the reactor, there was 0.8 pounds per minute of oxygen, and 0.3 pounds per minute of steam. The synthesis gas produced consisted of 1.4 pounds per minute of carbon monoxide and 0.1 pounds per minute of hydrogen. There was virtually no carbon black produced and considerable ash was produced. Even though the coal size was in an acceptable range, the oxygen to coal weight ratio was too high and the yield of carbon black was not measurable and the ash content, as a consequence, was very high.

EXAMPLE 2

In this case, the coal size was from 75 to 150 microns and for every pound of coal per minute that was passed through the reactor, there was 0.2 pounds per minute of oxygen. The synthesis gas produced contained 0.2 pounds per minute of carbon monoxide and a little hydrogen. The yield of carbon black was 0.2 pounds per minute, which is satisfactory from an economic standpoint, but the ash content of the carbon black was slightly greater than one percent due to the fact that the particle size was at the low end of the range.

EXAMPLE 3

In this case the coal size was from 150 microns to 425 microns and for every pound of coal per minute that was passed through the reactor, there was 0.2 pounds per minute of oxygen, and 0.1 pounds per minute of steam. The synthesis gas produced was 0.5 pounds per minute of carbon monoxide and 0.1 pound per minute of hydrogen. 0.2 pounds per minute of carbon black were produced, having an ash content of less than one percent. In this example, the oxygen to coal weight ratio was within the preferred range, as was the coal particle size.

EXAMPLE 4

In this case the coal size was from 150 to 425 microns and for every pound of coal per minute which passed through the reactor, there was 0.2 pounds per minute of oxygen and no steam was used. The snythesis gas comprised 0.1 pounds per minute of carbon monoxide and a little hydrogen. 0.2 pounds per minute of carbon black were produced, having an ash content of less than one percent. Again, the oxygen to coal weight ratio and the particle size of the coal were within the preferred range recited.

EXAMPLE 5

In this case the particle size of the coal was from 425 to 850 microns and for every pound of coal per minute passing through the reactor, 0.3 pounds per minute of oxygen was used. The synthesis gas contained 0.3 pounds per minute of carbon monoxide and 0.1 pounds per minute of hydrogen. 0.2 pounds per minute of carbon black were produced, having an ash content of less than one percent. In this case the coal particle size was within the preferred range and the oxygen to coal weight ratio was at the top end of the preferred ratio.

EXAMPLE 6

In this case the particle size of the coal was from 150 to 425 microns and no oxygen or steam was introduced. For every pound of coal per minute utilized, the synthesis gas produced contained 0.1 pounds per minute of carbon monoxide but the carbon black yield was cut in half to 0.1 pounds per minute, even though the ash content was less than one percent. Thus, the yield was dramatically reduced, even though the ash content was satisfactory.

EXAMPLE 7

In this case the particle size of the coal was from 850 to 1700 microns and for every pound of coal per minute passing through the reactor, 0.1 pounds per minute of oxygen was introduced. The synthesis gas contained 0.1 pounds per minute of carbon monoxide and a little hydrogen. Again, the yield of carbon black was 0.1 pounds per minute and the ash content was less than one percent. This example illustrates the upper end of the coal particle size of this invention and the lower end of the oxygen to coal weight ratio. While carbon black of satisfactory quality was produced, since the ash content was less than one percent, the yield had been cut in half.

While this invention has been described in its preferred embodiment, it is appreciated that slight variations, both in oxygen to coal weight ratio, and coal particle size, may be made without departing from the true scope and spirit of the invention.

What is claimed is:

1. A partial combustion method of producing commercially acceptable carbon black containing less than approximately one percent ash from carbonaceous material taken from the group consisting of coal, lignites, tar sand, pitch, oil shale and asphaltic substances, which comprises reacting said carbonaceous material with oxygen at a temperature of from 2200° F. to 3000° F., said carbonaceous material having an average particle size of from 75 microns to 1700 microns and wherein the oxygen to carbonaceous material weight ratio is no more than 0.4, and recovering said carbon black from said reaction.

2. The method of claim 1 wherein said carbonaceous material has an average particle size of from 150 microns to 850 microns and the oxygen to carbonaceous material weight ratio is from 0.1 to 0.3.

3. The method of claim 1 wherein said carbonaceous material is coal.

4. The method of claim 2 wherein said carbonaceous material is coal.

5. The method of claim 1 wherein char and synthesis gas are produced simultaneously with the production of said carbon black.

6. The method of claim 2 wherein char and synthesis gas are produced simultaneously with the production of said carbon black.

7. The method of claim 3 wherein char and synthesis gas are produced simultaneously with the production of said carbon black.

8. The method of claim 4 wherein char and synthesis gas are produced simultaneously with the production of said carbon black.

9. The method of claim 5 wherein said char is separated from said synthesis gas and carbon black by means of gravity.

10. The method of claim 9 wherein said carbon black and synthesis gas are separated from said char by means of a filter.

* * * * *